United States Patent
Giroux et al.

(10) Patent No.: US 9,798,544 B2
(45) Date of Patent: Oct. 24, 2017

(54) REORDERING BUFFER FOR MEMORY ACCESS LOCALITY

(71) Applicant: NVIDIA Corporation, Santa Clara, CA (US)

(72) Inventors: Olivier Giroux, San Jose, CA (US); Jack Hilaire Choquette, Palo Alto, CA (US); Xiaogang Qiu, San Jose, CA (US); Robert J. Stoll, Los Altos, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 500 days.

(21) Appl. No.: 13/710,004

(22) Filed: Dec. 10, 2012

(65) Prior Publication Data

US 2014/0164743 A1 Jun. 12, 2014

(51) Int. Cl.
G06F 9/30 (2006.01)
G06F 9/38 (2006.01)

(52) U.S. Cl.
CPC ...... *G06F 9/30145* (2013.01); *G06F 9/30152* (2013.01); *G06F 9/3808* (2013.01); *G06F 9/3851* (2013.01); *G06F 9/3855* (2013.01)

(58) Field of Classification Search
CPC .... G06F 9/3851; G06F 9/3885; G06F 9/3836; G06F 9/3867; G06F 9/3842; G06F 9/3808; G06F 9/30152
See application file for complete search history.

(56) References Cited

U.S. PATENT DOCUMENTS

| | | | | |
|---|---|---|---|---|
| 7,484,076 | B1* | 1/2009 | Oberman et al. | 712/203 |
| 7,634,637 | B1* | 12/2009 | Lindholm et al. | 712/22 |
| 7,746,350 | B1* | 6/2010 | Danilak | 345/538 |
| 2002/0124241 | A1* | 9/2002 | Grey | G06F 9/52 717/149 |
| 2005/0050307 | A1* | 3/2005 | Reinhardt | G06F 9/3863 712/227 |
| 2011/0023033 | A1* | 1/2011 | Memik | G06F 9/3851 718/100 |
| 2011/0276783 | A1* | 11/2011 | Golla | G06F 9/3851 712/200 |
| 2012/0198214 | A1* | 8/2012 | Gadre et al. | 712/225 |

* cited by examiner

*Primary Examiner* — Farley Abad
(74) *Attorney, Agent, or Firm* — Artegis Law Group, LLP

(57) ABSTRACT

Systems and methods for scheduling instructions for execution on a multi-core processor reorder the execution of different threads to ensure that instructions specified as having localized memory access behavior are executed over one or more sequential clock cycles to benefit from memory access locality. At compile time, code sequences including memory access instructions that may be localized are delineated into separate batches. A scheduling unit ensures that multiple parallel threads are processed over one or more sequential scheduling cycles to execute the batched instructions. The scheduling unit waits to schedule execution of instructions that are not included in the particular batch until execution of the batched instructions is done so that memory access locality is maintained for the particular batch. In between the separate batches, instructions that are not included in a batch are scheduled so that threads executing non-batched instructions are also processed and not starved.

23 Claims, 9 Drawing Sheets

REORDERING BUFFER FOR MEMORY ACCESS LOCALITY

BACKGROUND OF THE INVENTION

Field of the Invention

The disclosure generally relates to multi-threaded instruction scheduling, and more specifically to methods and apparatus for ordering thread execution for memory access locality.

Description of the Related Art

Parallel processors have multiple independent cores that enable multiple threads to be executed simultaneously using different hardware resources. SIMD (single instruction, multiple data) architecture processors execute the same instruction on each of the multiple cores where each core processes different input data. MIMD (multiple instruction, multiple data) architecture processors execute different instructions on different cores with different input data supplied to each core. Parallel processors may also be multi-threaded, which enables two or more threads to execute substantially simultaneously using the resources of a single processing core (i.e., the different threads are executed on the core during different clock cycles). Instruction scheduling refers to the technique for determining which threads to execute during the next clock cycle.

Conventional graphics programs identify memory read instructions that access texture map data so that an instruction scheduler within a graphics processor will schedule execution of the memory read instructions as a group, blocking execution of any other instructions until all of the memory read instructions are executed to read texture map data. Execution of the memory read instructions as a group is advantageous because the different accesses typically read previously read texture data or texture data stored in a cache line that has already been loaded from the backing memory. Therefore, memory access bandwidth may be reduced for texture map reads.

When the parallel processors executing the memory read instructions are multi-threaded, two different threads that are executing simultaneously may access different texture maps or different regions of one texture map. If the instruction scheduler interleaves memory read instructions for the two threads, the locality of the memory read instructions is disrupted, and graphics processing performance may suffer. To maintain locality of the texture memory read instructions, the instruction scheduler only allows texture memory read instructions that are identified as being in the same group to execute simultaneously. Scheduling and execution of all other instructions, including texture memory read instructions identified for a different group, are blocked by the instruction scheduler.

One problem with blocking the execution of all other instructions while one group of texture memory read instructions are executed by a first thread is that other threads are not processed to execute other instructions. When threads are scheduled for processing two or more groups of texture memory read instructions one after the other, other threads that process instructions that are not included in one of the groups are not processed for many clock cycles. Those other threads are effectively starved by the threads processing the groups of texture memory read instructions.

Accordingly, what is needed in the art is a system and method for ordering threads for execution so that locality is maintained for texture memory read instructions without starving threads processing instructions that do not read from texture memory.

SUMMARY OF THE INVENTION

In one embodiment, a multi-core processor includes a scheduling that reorders the execution of different threads to ensure that instructions specified as having localized memory access behavior are executed over one or more sequential clock cycles to benefit from memory access locality. At compile time, code sequences including memory access instructions that may be localized (as opposed to randomized) are delineated into separate batches. The scheduling unit ensures that multiple parallel threads are processed over one or more sequential scheduling cycles to execute the batched instructions. The scheduling unit waits to schedule execution of instructions that are not included in the particular batch until execution of the batched instructions is done so that memory access locality is maintained for the particular batch. In between the separate batches, the scheduling unit schedules execution of instructions that are not included in a batch so that threads executing non-batched instructions are also processed and not starved.

One example embodiment of the disclosure sets forth a computer-implemented method for scheduling instruction execution in a multi-threaded processor. The method comprises synchronizing a first thread group and a second thread group at a boundary delineating the start of a batch instruction sequence, where a first instruction and a second instruction in the batch instruction sequence are associated with localized memory access behavior. The batch instruction sequence is scheduled for execution over sequential cycles within a multi-threaded processing core by the first thread group and the second thread group. After scheduling the batch instruction sequence for execution by the first thread group and the second thread group, a third instruction is scheduled for execution within the multi-threaded processing core by a third thread group, where the third instruction is not included in the batch instruction sequence.

Another example embodiment of the disclosure sets forth a scheduling unit configured to synchronize a first thread group and a second thread group at a boundary delineating the start of a batch instruction sequence, where a first instruction and a second instruction in the batch instruction sequence are associated with localized memory access behavior. The scheduling unit schedules the batch instruction sequence for execution over sequential cycles within a multi-threaded processing core by the first thread group and the second thread group. After scheduling the batch instruction sequence for execution by the first thread group and the second thread group, the scheduling unit schedules a third instruction for execution within the multi-threaded processing core by a third thread group, where the third instruction is not included in the batch instruction sequence.

One advantage of the memory access ordering technique is that threads are ordered for execution so that locality is maintained for memory access instructions without starving threads processing instructions are not specified as having localized memory access behavior.

BRIEF DESCRIPTION OF THE DRAWINGS

So that the manner in which the above recited features of the present disclosure can be understood in detail, a more particular description, briefly summarized above, may be had by reference to example embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
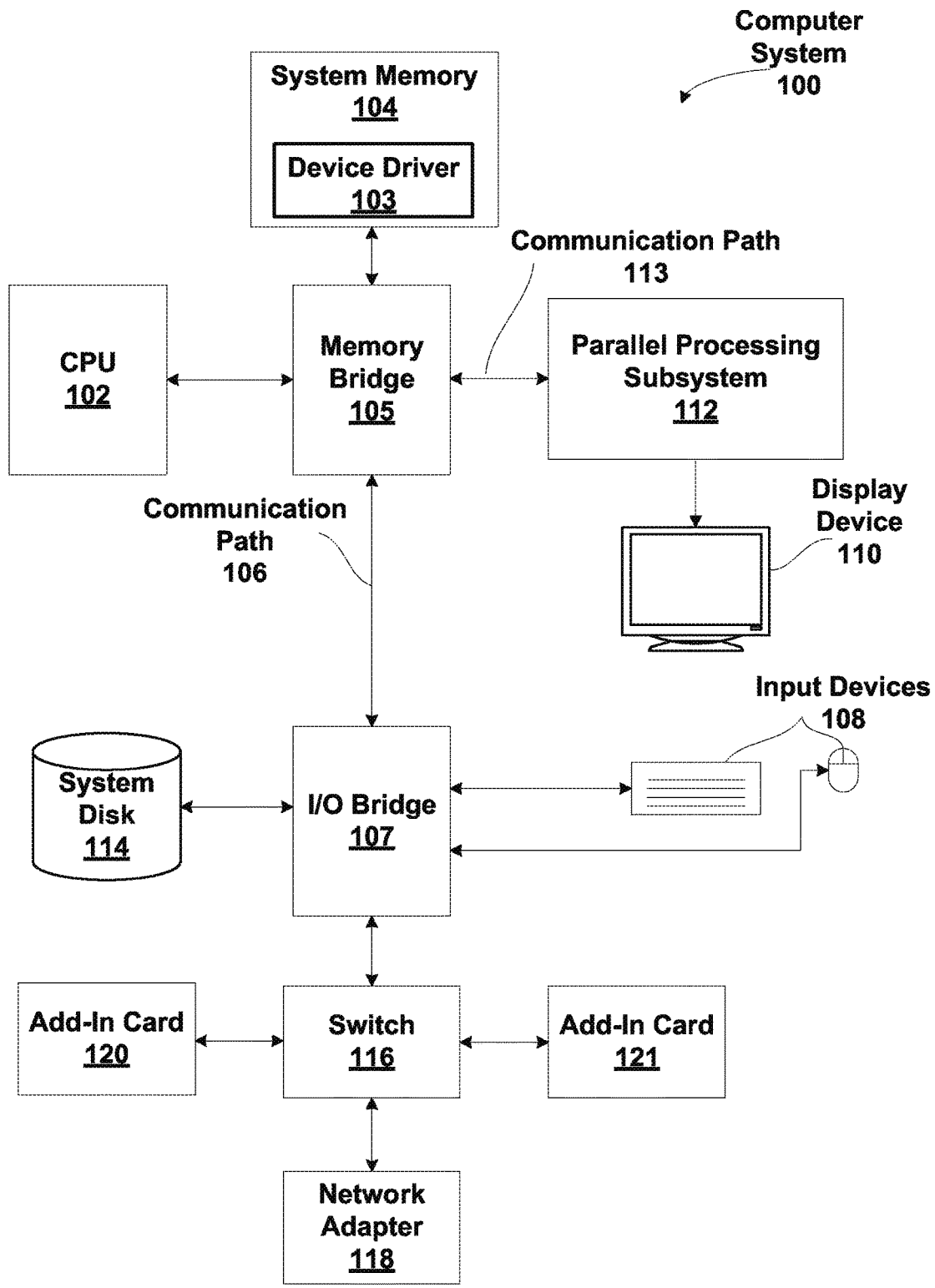
FIG. 1 is a block diagram illustrating a computer system configured to implement one or more aspects of the present disclosure.

FIG. 1 is a block diagram illustrating a computer system 100 configured to implement one or more aspects of the present disclosure. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communications paths 106 and 113, may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, 110 bridge 107 and memory bridge 105 might be integrated into a single chip instead of existing as one or more discrete devices. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
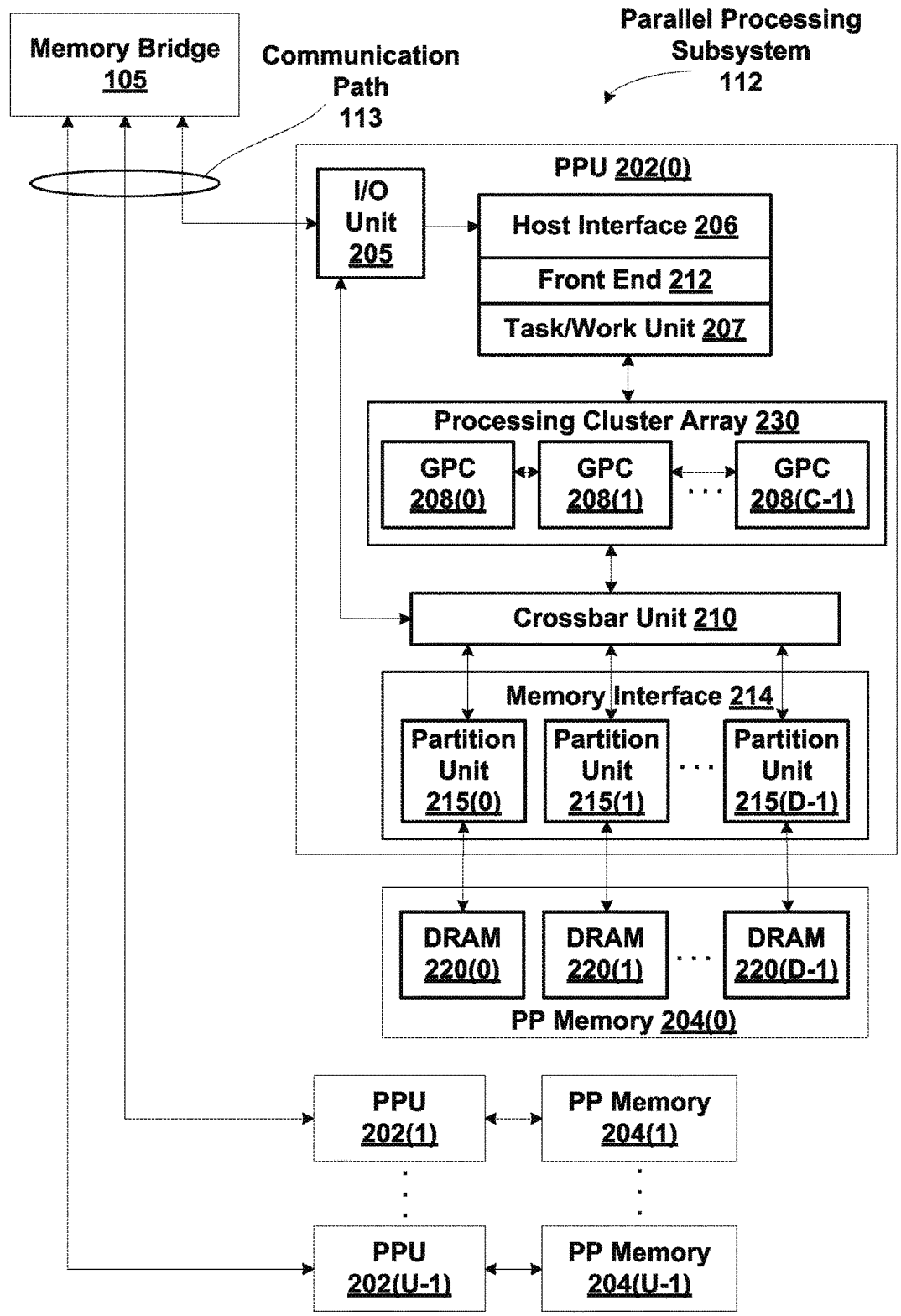
FIG. 2 is a block diagram of a parallel processing subsystem for the computer system of FIG. 1, according to one embodiment of the present disclosure.

FIG. 2 illustrates a parallel processing subsystem 112, according to one embodiment of the present disclosure. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
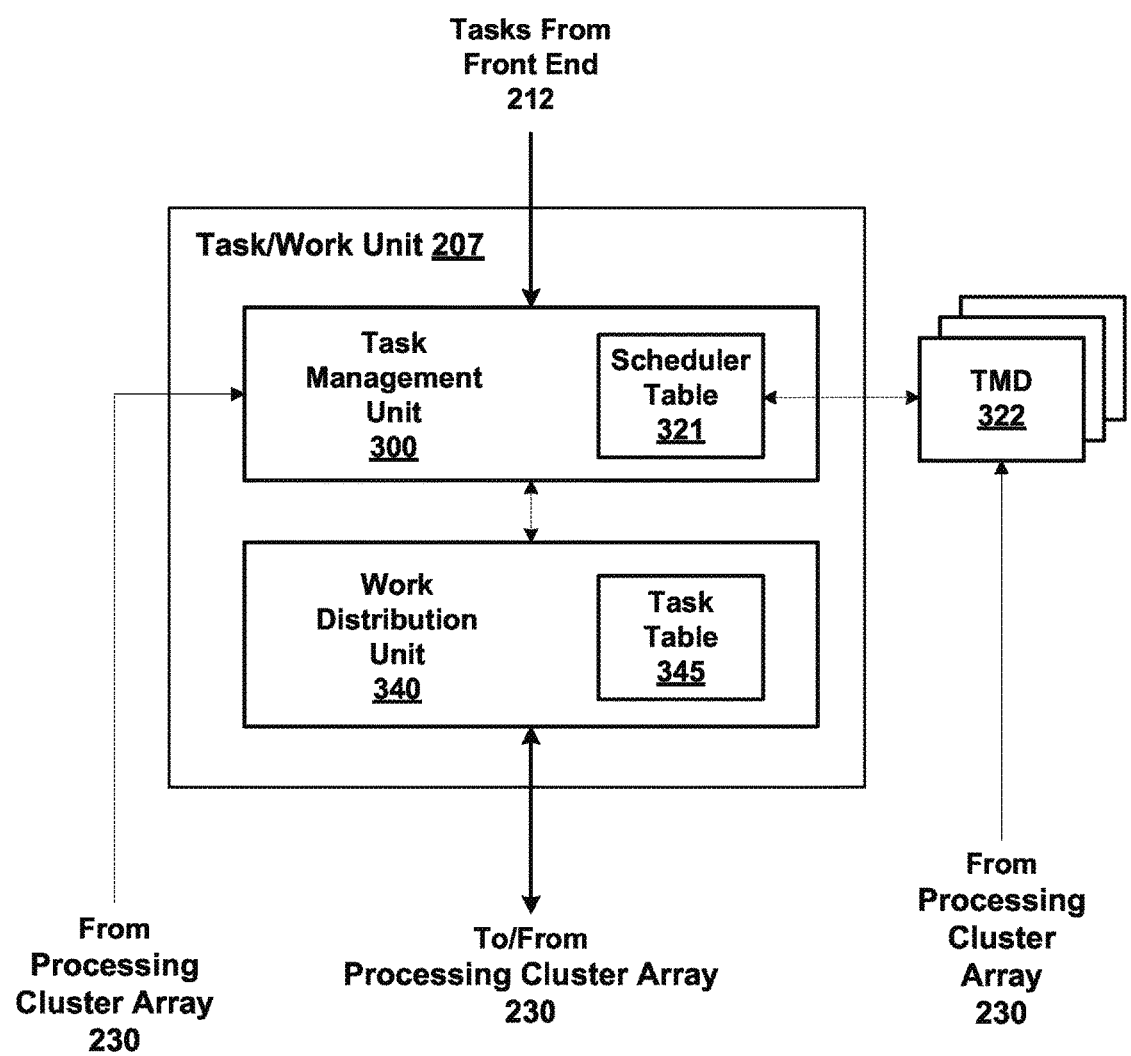
FIG. 3A is a block diagram of the front end of FIG. 2, according to one embodiment of the present disclosure.

FIG. 3A is a block diagram of the task/work unit 207 of FIG. 2, according to one embodiment of the present disclosure. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task will resume at a later time. When a child processing task is generated, during execution of a task, a pointer to the child task is added to the list of task pointers to be scheduled. A child task may be generated by a TMD 322 executing in the processing cluster array 230.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory. Another difference between the tasks that are provided through pushbuffers and child tasks is that the tasks provided through the pushbuffers are defined by the application program whereas the child tasks are dynamically generated during execution of the tasks.

Task Processing Overview

Figure 3B:
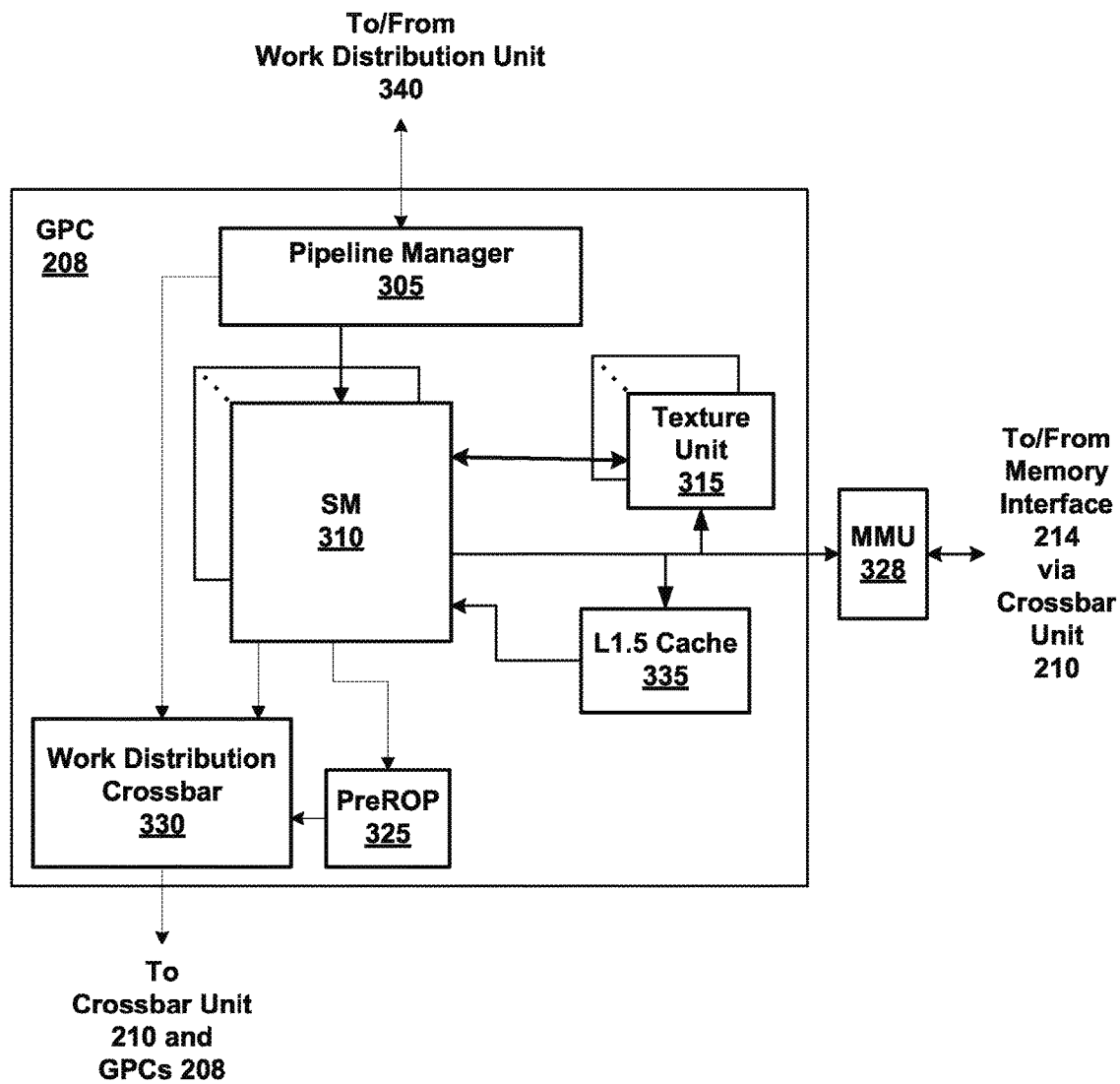
FIG. 3B is a block diagram of a general processing cluster within one of the parallel processing units of FIG. 2, according to one embodiment of the present disclosure.

FIG. 3B is a block diagram of a GPC 208 within one of the PPUs 202 of FIG. 2, according to one embodiment of the present disclosure. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
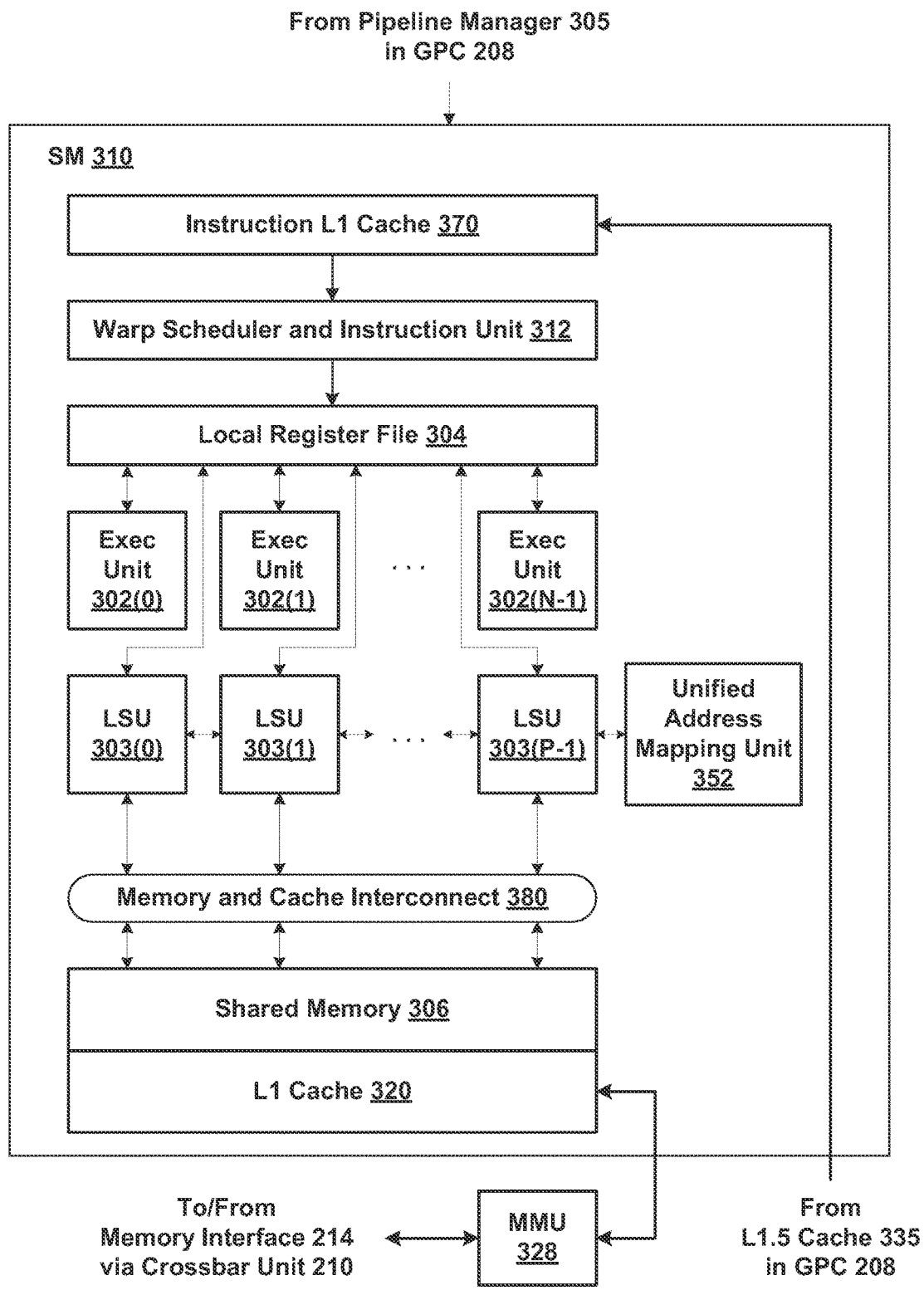
FIG. 3C is a block diagram of a portion of the streaming multiprocessor of FIG. 3B, according to one embodiment of the present disclosure.

FIG. 3C is a block diagram of the SM 310 of FIG. 3B, according to one embodiment of the present disclosure. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

Instruction Scheduling

The programs executed by the SMs 310 may have spatial and temporal memory locality behavior that can reduce memory access bandwidth and latency when the data fetched from memory is stored in the comparatively small L1 cache 370. Programs delineate sequences of program instructions that should be executed in sequential clock cycles for one or more warps without intervening memory access instructions so that the data accessed by the delineated sequence is retained in the L1 cache 370. The first (or all) instructions in a delineated sequence may be annotated with a "start batch" scheduling hint and a last instruction in the delineated sequence may be annotated with an "end batch" scheduling hint. A compiler may be configured to insert scheduling hints during compile time.

A batch is defined dynamically within the warp scheduler and instruction unit 312 when warps reach a delineated sequence of instructions. The warp scheduler and instruction unit 312 enforces a total order of execution for the different warps processing the batch. Particular instructions in the batch may encode additional locality information using a ".T" suffix to denote a partial ordering between the memory instructions in the batch. A last instruction to which the partial ordering should be applied may be annotated with a ".P"-suffix. A compiler may be configured to insert the suffix annotations or to interpret existing suffix annotations during compile time.

The warp scheduler and instruction unit 312 schedules warps processing non-batched instructions by applying the minimal order required by sequential consistency semantics. Instructions that are within a first batch are scheduled for execution without any intervening instructions that are not in the first batch. Instructions that are in a different batch or that are not in any batch may be scheduled for execution either before or after the first batch.

Dynamically, a batch is initiated by the warp scheduler and instruction unit 312 when at least one warp reaches an instruction annotated with a "start batch" scheduling hint. One or more warps may process the batch together. The number of warps included in a batch may be defined based on which warps reach the same start batch hint within a specified amount of time. The specified amount of time may be controlled by a setting. In other words, one or more warps may participate in the batch. Other warps may dynamically initiate a new batch from the same delineated sequence of instructions including the same start batch scheduling hint at a different time. Once a batch is initiated, a group of warps processes the whole batch, without adding or removing any warps.

Figure 4:
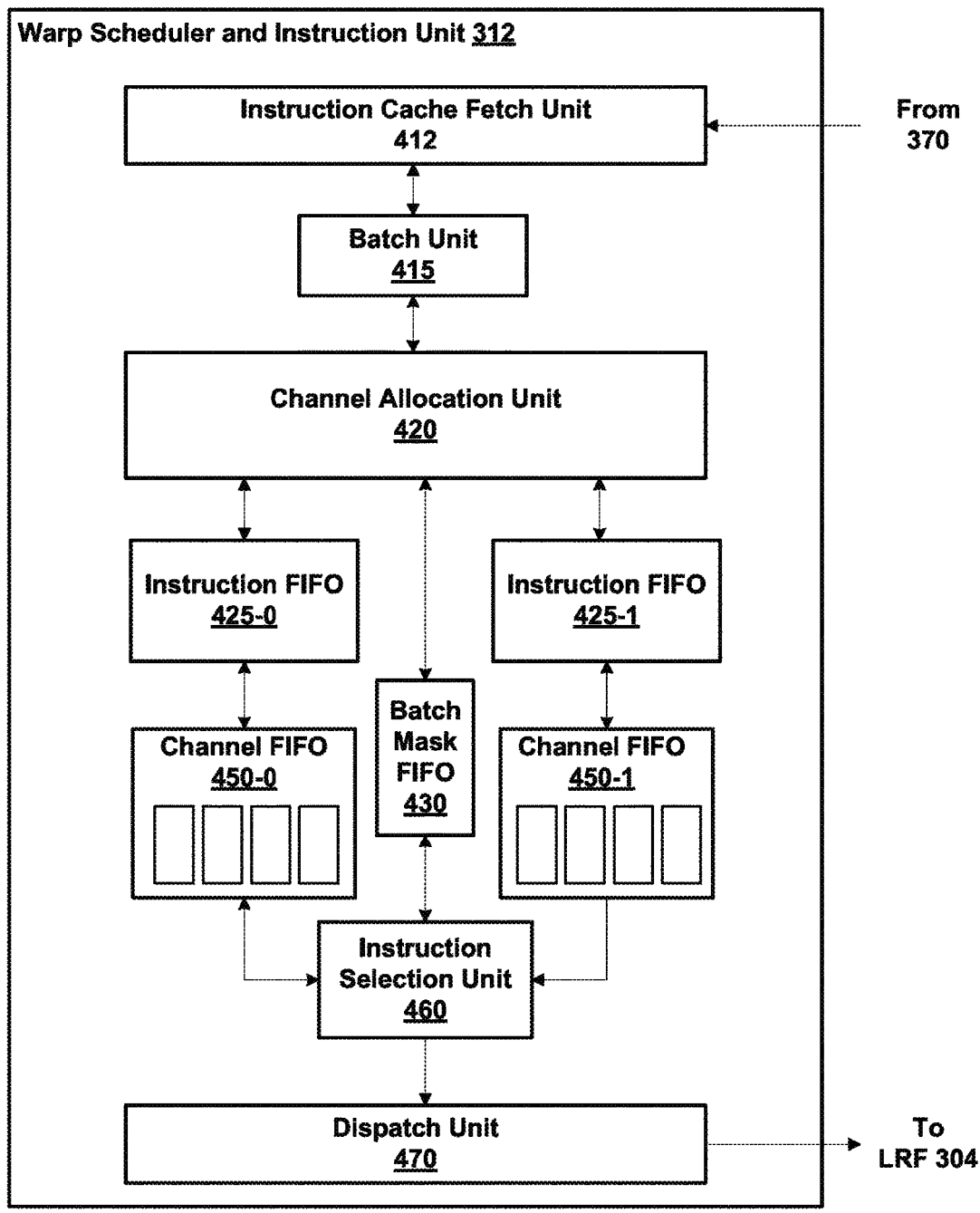
FIG. 4 is a block diagram of the warp scheduler and instruction unit of FIG. 3C, according to one example embodiment of the present disclosure.

FIG. 4 is a block diagram of the warp scheduler and instruction unit 312 of FIG. 3C, according to one example embodiment of the present disclosure. As shown in FIG. 4, the warp scheduler and instruction unit 312 includes an instruction cache fetch unit 412 that is configured to fetch cache lines containing the instructions for warps from the instruction L1 cache 370. In one embodiment, each cache line is 512 bits wide, storing eight instructions (64 bits wide) in a single cache line. The instruction cache fetch unit 412 buffers and outputs instructions fetched from the instruction L1 cache 370 to the batch unit 415. The batch unit 415 gathers warps into batches and outputs the batch and non-batch instructions to a channel allocation unit 420. The batch unit 415 synchronizes two or more warps at the instruction delineating the start of a batch instruction sequence to gather the warps for processing the batch instruction sequence.

The channel allocation unit 420 provides instructions to channels within instruction FIFO's 425. The channel allocation unit 420 determines when each warp is ready to be scheduled, for example, when all long-term dependencies have been cleared and a free channel is available for use in instruction FIFO's 425. In one embodiment, the maximum number of warps that may execute a batch simultaneously is 8 and 8 different channels are available for allocation. Each instruction FIFO 425-0, 425-1 queues instructions for 4 different channels, for a total of 8 channels. The channel allocation unit 420 may be configured to allocate warps to channels based on priority levels of the different warps. Warps processing the same batch may inherit the highest priority of any of the warps in the same batch. The priority may be assigned based on various factors. In one embodiment, priority may be based on when the warp was scheduled on SM 310 (i.e., the longest pending warp may have the highest priority). In other embodiments, the priority may for each warp may be specified by the program that is defined by the instructions executed by the warp.

A warp allocates into a channel when an entry is available in the queue corresponding to the channel and the corresponding bit in the batch mask is not set. When a warp allocates into a channel, the corresponding bit in the batch mask is set. When the last warp of a batch is allocated, the batch mask, having at least one bit set, is pushed to the batch mask FIFO 430. Warps that do not participate in a batch do not set bits in a batch mask. No batch mask is pushed to the batch mask FIFO 430 for the scheduling of warps that do not participate in a batch.

A different batch mask is generated for each batch. Each batch mask includes one bit for each channel. The channel allocation unit 420 uses the batch mask to ensure that each warp processing a batch is allocated to a different channel and to determine when all of the warps that participate in a batch are allocated to channels. If a channel already processing a warp for a batch would be allocated to another warp processing the same batch, the warp is instead allocated a different channel.

As entries are available in the instruction FIFOs 425, the instructions for each warp that is allocated a channel in instruction FIFO 425-0 or 425-1 are pushed into the respective channel queue in program order. Each queue entry also stores a flag indicating whether or not the instruction stored in the queue entry is included in a batch. Each queue corresponding to a channel in the FIFOs 425 inputs instructions and flags to a corresponding queue within a channel FIFO 450. When the last instruction in a batch is pushed into a queue within the channel FIFO 450-0 or 450-1, an "end of batch" synthetic instruction is pushed into the queue.

An instruction selection unit 460 maintains a select mask indicating which queues within a channel FIFO 450 may be selected to dispatch an instruction. In one embodiment, the instruction selection unit 460 may dispatch the instruction at the head of any queue within a channel in channel FIFO 450 that is not empty and whose corresponding bit in the selection mask is set. If the instruction selection unit 460 dispatches an instruction for execution that has the ".T" suffix, the corresponding bit is cleared in the selection mask. The ".T" suffix causes the instruction selection unit 460 to perform partial ordering between the memory instructions in the batch. By clearing the corresponding bit in the selection mask, the partial ordering causes a first warp to not execute any further instructions until a new selection mask is provided. When partial ordering is not used for a warp, the warp may continue executing instructions.

When the selection mask is empty, a new mask is computed in a manner that guarantees fairness and forward progress for the different warps. Any non-batch instruction that is queued ahead of a batch instruction for a channel, i.e., a blocking instruction, is selected for execution before either a non-blocking instruction or a batch instruction. The instruction selection unit 460 identifies blocking instructions by examining the batch mask at the head of the batch mask FIFO 430 and the batch flags of the instructions at the head of each queue of the channel FIFOs 450. When at least one of the queues within the channel FIFOs 450 has a blocking instruction at the head, the selection mask is set to the logical AND of the batch mask at the head of the batch mask FIFO 430 and the inverted batch flags of the heads of each valid entry queued in the channel FIFOs 450. When there are no blocking instructions, the instruction selection unit 460 may be configured to alternate between selecting a sequence of non-batch instructions from one or more queues of the channel FIFO 450 and selecting batch instructions for all channels having corresponding bits of the batch mask set. When selecting batch instructions, the selection mask is initialized as the batch mask at the head of the batch mask FIFO 430. When selecting non-batch instructions, the selection mask is initialized as the inverted batch flags of the heads of each valid entry queued in the channel FIFOs 450.

When an "end of batch" synthetic instruction is reached during selection of batch instructions, the corresponding bit in the batch mask at the head of the batch mask FIFO 430 is cleared. The corresponding bit in the selection mask is also cleared. When all of the bits in the batch mask are cleared, all of the batch instructions have been selected for execution by the instruction selection unit 460 and the batch mask is popped from the batch mask FIFO 430.

The instruction selection unit 460 selects the next instruction to issue, pops the instruction from the selected queue in the channel FIFOs 450 and outputs the instruction to the dispatch unit 470. The dispatch unit 470 dispatches the instruction for execution in the order in which the instructions are received from the instruction selection unit 460. In some embodiments, depending on the architecture of SM 310, instructions may be dual or quad issued, meaning that more than one instruction may be selected and dispatched in a particular clock cycle.

Figure 5:
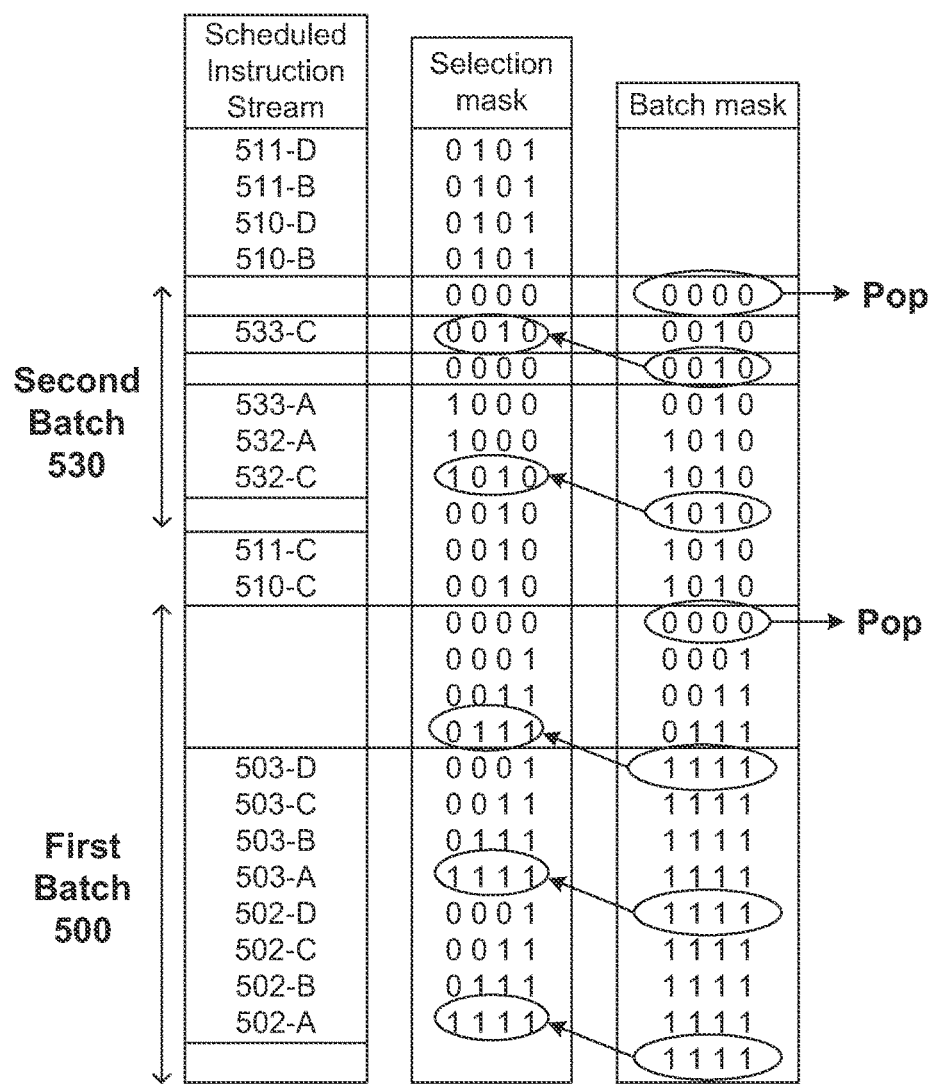
FIG. 5 illustrates four queues of FIFO channel instructions and a corresponding 4-bit batch mask along with the resulting scheduled instruction stream that is output by the warp scheduler and instruction unit of FIG. 4, according to one example embodiment of the present disclosure.

FIG. 5 illustrates four queues of FIFO channel instructions and a corresponding 4-bit batch mask along with the resulting scheduled instruction stream that is output by the warp scheduler and instruction unit 312, according to one example embodiment of the present disclosure. The instruction at the head of each queue in the channel FIFO is a start batch instruction 501. The batch mask at the head of the match mask FIFO is 1 1 1 1, indicating that all four channels store instructions in the same first batch 500. The first batch 500 includes instructions 502 and 503 and the end of the first batch 500 is indicated by the "end of batch" synthetic instruction end 504. The start 501 and end 504 instructions are not scheduled for execution, and are therefore not included in the scheduled instruction stream. The instructions that are queued and scheduled are annotated according to the channel in which the instructions are queued for clarity.

A second batch is delineated by the start batch instruction 531 and the "end of batch" synthetic instruction, end 534. The batch mask for the second batch 530 is 1 0 1 0, indicating that only two of the four channels, channels A and C store instructions included in the batch. The batch includes instructions 532 and 533. Instructions 510, 511, 520 and 521 are unbatched instructions.

The instruction selection unit 460 begins scheduling the instructions shown in FIG. 5 by first initializing the selection mask to the batch mask at the head of the batch mask FIFO 430, batch mask=1 1 1 1 as shown at the bottom of the selection mask column in FIG. 5. The batch start 501 is not inserted into the scheduled instruction stream, so a blank cycle is shown for the processing of the start 501. In one embodiment, the start and end instructions may be processed by the instruction selection unit 460 without delaying the scheduled instruction stream by one or more cycles.

After initializing the selection mask, the instruction selection unit 460 then determines that partial ordering is not specified for the instructions in the first batch 500 and selects an instruction from each warp that is participating in the batch, i.e., instructions from channels A, B, C, and D, in sequence. As an instruction is popped from each channel, the bit in the selection mask corresponding to the channel is cleared.

When all of the bits in the selection mask are cleared the instruction selection unit 460 determines if all of the bits in the batch mask are cleared, and, if so, scheduling of the batch is complete. Otherwise, the batch mask is copied to the selection mask and the instruction selection unit 460 continues the selection process.

Copying of the batch mask to the selection mask is shown in FIG. 5 after instructions 502-A, 502-B, 502-C, and 502-D are output in the scheduled instruction stream for the first batch 500. After the batch mask is copied to the selection mask, the instruction selection unit 460 schedules instructions 503-A, 503-B, 503-C, and 503-D. As each of instructions 503-A, 503-B, 503-C, and 503-D are popped, the corresponding bits of the selection mask are cleared.

When the popped instruction is an "end of batch" synthetic instruction, as shown by the blank space in the scheduled instruction stream, the bit in the selection mask corresponding to the channel is cleared and the bit in the batch mask corresponding to the channel is also cleared. The instruction selection unit 460 then pops the cleared batch mask.

Before the second batch 530 can be processed, blocking non-batch instructions in the C channel queue are scheduled. The selection mask is computed by the instruction selection unit 460 to enable scheduling of the C channel and instructions 510-C and 511-C are output to the scheduled instruction stream. Then the instruction selection unit 460 copies the batch mask indicating that the warps allocated to channels A and C participate in the second batch 530. to the selection mask. The batch start 531 is not inserted into the scheduled instruction stream, so a blank cycle is shown for the processing of the start 531.

After initializing the selection mask, the instruction selection unit 460 then determines that in instruction from warp C indicates that partial ordering is specified. Instruction selection unit 460 clears a bit corresponding to warp C in the selection mask, and selects all of the instructions from warp A. When the end instruction is popped from the A channel, the bit in the selection mask corresponding to the A channel is cleared and the bit in the batch mask corresponding to the A channel is also cleared. The remaining instruction from the C channel is then popped and output to the scheduled instructions stream. When the end instruction is popped from the C channel, the bit in the selection mask corresponding to the C channel is cleared and the bit in the batch mask corresponding to the C channel is also cleared. Because the batch mask is cleared, the instruction selection unit 460 then pops the batch mask.

The remaining instructions in the channel FIFO 450 are non-batch instructions in channels B and D. The instruction selection unit 460 computes the selection mask needed to schedule channels B and D and then schedules the instructions 510 and 511 by alternating selection between channel B and D until all of the remaining instructions are scheduled. Locality of memory access is ensured for instructions in the first batch 500 and the second batch 530 while the non-batch instructions are also processed. Importantly, warps that process non-batch instructions are able to make forward progress and are not starved.

Figure 6:
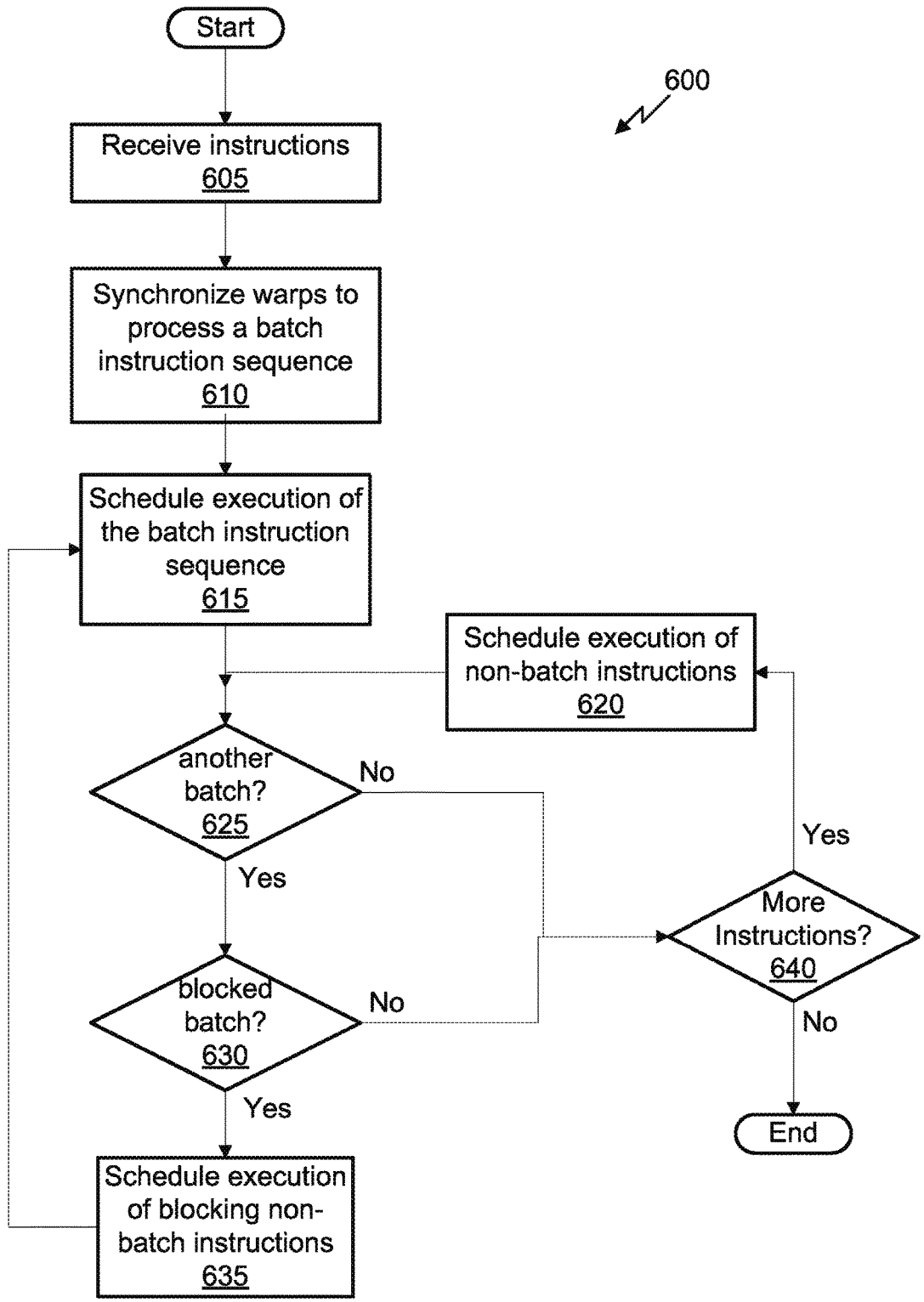
FIG. 6 illustrates a method for scheduling instructions for execution, according to one example embodiment of the present disclosure.

FIG. 6 illustrates a method 600 for scheduling instructions for execution, according to one example embodiment of the present disclosure. Although the method steps are described in conjunction with the systems of FIGS. 1, 2, 3A-3C, 4 and 5 persons of ordinary skill in the art will understand that any system configured to perform the method steps, in any order, is within the scope of the disclosure.

Method 600 begins at step 605, where the warp scheduler and instruction unit 312 receives a plurality of instructions associated with two or more warps fetched from the instruction L1 cache 370. At step 610 the batch unit 415 synchronizes two or more warps (e.g., thread groups) at a boundary delineating the start of a batch instruction sequence. At least one instruction in the batch instruction sequence is associated with localized memory access behavior. At step 615 the channel allocation unit 420 and instruction selection unit 460 schedule execution of the batch instruction sequence by the two or more warps on an SM 310. Importantly, the instruction selection unit 460 selects instructions in the batch sequence for execution in sequential cycles without scheduling any instructions that are not included in the batch sequence until after the batch sequence is scheduled for execution by all of the warps that were synchronized at step 610.

At step 625 the instruction selection unit 460 determines if another batch is ready to be processed by checking if a batch mask is available in the batch mask FIFO 430. If another batch is not available, the instruction selection unit 460 proceeds directly to step 640. Otherwise, at step 630 the instruction selection unit 460 determines if the instructions queued in the channel FIFOs 450 for the next batch are blocked by any non-batch instructions that are also queued in the channel FIFOs 450. If the instructions for the batch are blocked for one or more queues in the channel FIFOs 450, then at step 635 the instruction selection unit 460 selects the blocking non-batch instructions for execution before selecting any of the instructions for the batch before returning to step 615 to schedule execution of the batch. Isolating execution of the non-batch instructions from the batch instructions ensures that memory access locality is maintained during execution of the batch instructions. Scheduling execution of the non-batch instructions either before or after all of the instructions for a batch are scheduled also ensures that forward progress is made for warps processing the non-batch instructions.

If, at step 625 another batch is not available, then at step 640 the instruction selection unit 460 determines if more instructions are stored in the queues within the channel FIFOs 450. If, at step 630 the instruction selection unit 460 determines that the instructions queued in the channel FIFOs 450 for the next batch are not blocked by non-batch instructions, then the instruction selection unit 460 also proceeds to step 640 and determines if more instructions are stored in the queues within the channel FIFOs 450. If more instructions are not stored in either the instruction FIFOs 425 or the channel FIFOs 450, then the scheduling process is complete, at least until additional instructions are received. Otherwise, at step 620 the instruction selection unit 460 schedules the execution of non-batch instructions stored in the channel FIFOs 450 before returning to step 625.

Figure 7:
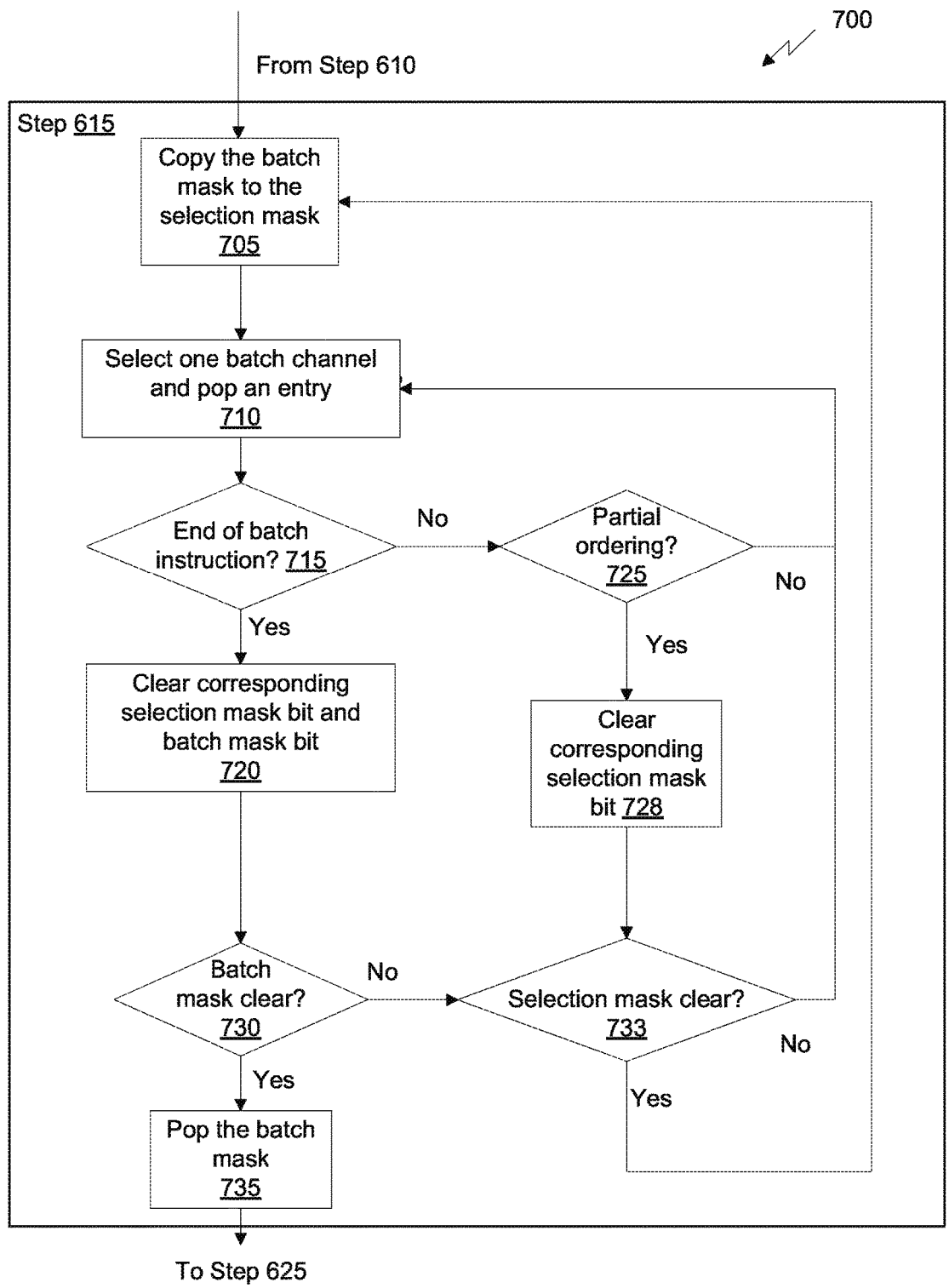
FIG. 7 illustrates a method for performing a step shown in FIG. 6, according to one example embodiment of the present disclosure.

FIG. 7 illustrates a method for performing step 615 shown in FIG. 6, according to one example embodiment of the present disclosure. The steps shown in method 700 may be used to perform at least a portion of step 615. Although the method steps are described in conjunction with the systems of FIGS. 1, 2, 3A-3C, 4 and 5 persons of ordinary skill in the art will understand that any system configured to perform the method steps, in any order, is within the scope of the disclosure.

The method shown in FIG. 7 is performed by the instruction selection unit 460 for each scheduling cycle. Step 615 begins at step 705, where the instruction selection unit 460 copies the batch mask at the head of the batch mask FIFO 430 to the selection mask stored within the instruction selection unit 460.

At step 710, a single queue within a channel FIFO 450 (a "batch channel") that stores a batch instruction is selected and the head entry instruction is popped. Only instructions that have corresponding bits set in both the batch mask and the selection mask will be popped in step 710. Instruction selection unit 460 can pop any such instruction from channel FIFO 450.

At step 715, the instruction selection unit 460 determines if the popped instruction is an "end of batch" synthetic instruction. If the popped instruction is an "end of batch" synthetic instruction, all of the instructions in the batch channel for the current batch have been scheduled. Therefore, in step 720, instruction selection unit 460 clears the bit in the selection mask corresponding to the batch channel, and the instruction selection unit 460 clears the batch mask bit corresponding to the batch channel in the head entry stored in batch mask FIFO 430. Clearing corresponding bits in the batch mask and selection mask prevents popping entries from the channel FIFO that have finished scheduling for the current batch.

At step 730, the instruction selection unit 460 checks whether the batch mask is clear. If the batch mask is clear, the current batch has finished scheduling on all channels, the method 700 proceeds to step 735. In step 735, the instruction selection unit 460 pops the batch mask, and the method 600 proceeds to step 625. If in step 730, the batch mask is not clear, then the current batch has not finished scheduling on all channels, and the method 700 proceeds to step 733, where the instruction selection unit 460 checks the selection mask to determine if it is clear. Step 733 is discussed below.

Returning to step 715, if the instruction is not an end of batch synthetic instruction, then the method 700 proceeds to step 725. At step 725, the instruction selection unit 460 determines if the instruction has a suffix indicating that partial ordering is set (".T"). If the instruction has a suffix indicating that partial ordering is set, then the method 700 proceeds to step 728. A suffix indicating that partial ordering is set prevents the corresponding channel from issuing instructions at least until a new selection mask is set, for example at step 705. Therefore, at step 728, the instruction selection unit 460 clears the corresponding selection mask bit, which prevents the corresponding channel from issuing instructions until a new selection mask is set. The method 700 then proceeds to step 733. If in step 725, partial ordering is not set, then the instruction selection unit 460 does not modify the selection bit mask and the method 700 proceeds back to step 710. Instructions may still be selected from the corresponding channel.

At step 733, the instruction selection unit 460 checks whether the selection mask is clear. Regardless of whether the selection mask is clear, the only way for method 700 to reach step 733 is if batch mask is not clear. If the batch mask is not clear, there are still instructions left to be scheduled for the current batch. Therefore, the instruction scheduling unit 460 determines how to proceed in step 733. If the selection mask is clear, the method 700 loops back to step 705, in which the batch mask is copied to the selection mask, and scheduling of the current batch continues. If the selection mask is not clear, the method 700 simply loops back to step 710 and another instruction is popped utilizing the current selection mask.

In sum, the instruction selection unit 460 schedules processing of a warp of parallel threads each scheduling cycle. One or more warps of parallel threads processing the same instruction batch are scheduled for processing on sequential scheduling cycles so that memory access locality is maintained. Warps of parallel threads processing different instruction batches may be reordered along with warps of parallel threads processing non-batched instructions so that batched and non-batched instructions are executed and memory access locality is maintained.

One advantage of the disclosed technique is that threads are ordered for execution so that locality is maintained for memory access instructions without starving threads processing instructions that are not specified as having localized memory access behavior. Additionally, an instruction batch may be delineated for memory access instructions that read or write any type of data, not just texture map data.

One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The disclosure has been described above with reference to specific embodiments. Persons of ordinary skill in the art, however, will understand that various modifications and changes may be made thereto without departing from the broader spirit and scope of the disclosure as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A method for scheduling instruction execution in a multi-threaded processor, the method comprising:
    synchronizing a first thread group and a second thread group at a boundary inserted by a compiler that delineates the start of a batch instruction sequence, wherein a first instruction and a second instruction in the batch instruction sequence are associated with localized memory access behavior;
    scheduling the batch instruction sequence for execution over sequential cycles within a multi-threaded processing core by the first thread group and the second thread group; and
    after scheduling the batch instruction sequence for execution by the first thread group and the second thread group, scheduling a third instruction for execution within the multi-threaded processing core by a third thread group, wherein the third instruction is not included in the batch instruction sequence.

2. The method of claim 1, further comprising allocating the first thread group to a first processing channel from which instructions are selected for execution and allocating the second thread group to a second processing channel from which instructions are selected for execution.

3. The method of claim 2, further comprising generating a batch mask that indicates the processing channels that are allocated to the first thread group and the second thread group.

4. The method of claim 3, further comprising:
    generating a channel selection mask based on the batch mask; and
    modifying the channel selection mask based on an instruction suffix that indicates a processing order for the first thread group and the second thread group.

5. The method of claim 2, further comprising queuing the batch instruction sequence for each processing channel that is allocated to the first thread group and the second thread group.

6. The method of claim 1, wherein instructions included in the batch instruction sequence are selected for processing by the first thread group until an end of batch instruction is received.

7. The method of claim 1, further comprising, prior to the step of scheduling the batch instruction sequence for execution:
    identifying a blocking instruction that is not included in the batch instruction sequence for execution within the multi-threaded processing core by a fourth thread group, wherein the fourth thread group is allocated a first processing channel and the first thread group is also allocated the first processing channel; and
    scheduling a fourth instruction for execution within the multi-threaded processing core.

8. A processing core, comprising:
    one or more execution units configured to execute one or more threads;
    a scheduling unit that schedules threads for execution across the one or more execution units and is configured to:
        synchronize a first thread group and a second thread group at a boundary that delineates the start of a batch instruction sequence,
        schedule the batch instruction sequence for execution within the processing core by the first thread group and the second thread group, wherein instructions included in the batch instruction sequence access different portions of memory that are proximate to one another; and
        after scheduling the batch instruction sequence for execution within the processing core, schedule a subsequent instruction for execution within the processing core, wherein the subsequent instruction is not included in the batch instruction sequence.

9. The processing core of claim 8, wherein the scheduling unit is further configured to allocate the first thread group to a first processing channel from which instructions are selected for execution and allocate the second thread group to a second processing channel from which instructions are selected for execution.

10. The processing core of claim 9, wherein the scheduling unit is further configured to generate a batch mask that indicates the processing channels that are allocated to the first thread group and the second thread group.

11. The processing core unit of claim 10, wherein the scheduling unit is further configured to:

generate a channel selection mask based on the batch mask; and modify the channel selection mask based on an instruction suffix that indicates a processing order for the first thread group and the second thread group.

12. The processing core of claim 9, wherein the scheduling unit is further configured to queue the batch instruction sequence for each processing channel that is allocated to the first thread group and the second thread group.

13. The processing core of claim 8, wherein the scheduling unit is further configured to select instructions included in the batch instruction sequence for processing by the first thread group and in the batch instruction sequence for processing by the second thread group.

14. The processing core of claim 8, wherein the scheduling unit is further configured to, prior to scheduling the batch instruction sequence for execution:

identify a blocking instruction that is not included in the batch instruction sequence for execution within the processing core; and schedule the blocking instruction for execution within the processing core.

15. The processing core of claim 8, wherein the boundary that delineates the start of the batch comprises a start batch instruction inserted into an instruction sequence by a compiler.

16. The processing core of claim 8, wherein an instruction in the batch instruction sequence includes an instruction suffix to denote an execution order within the batch instruction sequence based on additional memory locality.

17. The processing core of claim 8, wherein the subsequent instruction also is not included in a second batch instruction sequence, the subsequent instruction is scheduled for execution within the processing core prior to when the second batch instruction sequence is scheduled for execution within the processing core, and instructions included in the second batch instruction sequence access different portions of memory that are proximate to one another.

18. A computing system, comprising:

a central processing unit (CPU); and a second processor having a processing core that includes scheduling unit configured to:

synchronize a first thread group and a second thread group at a boundary that delineates the start of a batch instruction sequence;

schedule the batch instruction sequence for execution within the processing core by the first thread group and the second thread group, wherein instructions included in the batch instruction sequence access different portions of memory that are proximate to one another; and schedule a subsequent instruction for execution within the processing core, wherein the subsequent instruction is not included in the batch instruction sequence.

19. The computing system of claim 18, wherein the scheduling unit is further configured to allocate the first thread group to a first processing channel from which instructions are selected for execution and allocate the second thread group to a second processing channel from which instructions are selected for execution.

20. The computing system of claim 19, wherein the scheduling unit is further configured to generate a batch mask that indicates the processing channels that are allocated to the first thread group and the second thread group.

21. The computing system of claim 20, wherein the scheduling unit is further configured to:

generate a channel selection mask based on the batch mask; and modify the channel selection mask based on an instruction suffix that indicates a processing order for the first thread group and the second thread group.

22. The computing system of claim 19, wherein the scheduling unit is further configured to queue the batch instruction sequence for each processing channel that is allocated to the first thread group and the second thread group.

23. The computing system of claim 18, wherein the scheduling unit is further configured to select instructions included in the batch instruction sequence for processing by the first thread group and in the batch instruction sequence for processing by the second thread group.

* * * * *

UNITED STATES PATENT AND TRADEMARK OFFICE
CERTIFICATE OF CORRECTION

| | |
|---|---|
| PATENT NO. | : 9,798,544 B2 |
| APPLICATION NO. | : 13/710004 |
| DATED | : October 24, 2017 |
| INVENTOR(S) | : Olivier Giroux et al. |

It is certified that error appears in the above-identified patent and that said Letters Patent is hereby corrected as shown below:

In the Claims

Column 20, Claim 11, Line 66, please delete "unit".

Signed and Sealed this
Thirtieth Day of January, 2018

Joseph Matal
*Performing the Functions and Duties of the
Under Secretary of Commerce for Intellectual Property and
Director of the United States Patent and Trademark Office*